No. 870,660. PATENTED NOV. 12, 1907.
J. F. ALEXANDER.
COMBINED FEED AND WATER BUCKET.
APPLICATION FILED FEB. 23, 1907.

Witnesses
Carl Stoughton
F. F. Campbell

Inventor
John F. Alexander
By Chester C. Shephard
Attorney.

UNITED STATES PATENT OFFICE.

JOHN F. ALEXANDER, OF COLUMBUS, OHIO, ASSIGNOR OF ONE-HALF TO E. W. STRIBLING, OF COLUMBUS, OHIO.

COMBINED FEED AND WATER BUCKET.

No. 870,660.   Specification of Letters Patent.   Patented Nov. 12, 1907.

Application filed February 23, 1907. Serial No. 358,775.

*To all whom it may concern:*

Be it known that I, JOHN F. ALEXANDER, a citizen of the United States, residing at Columbus, in the county of Franklin and State of Ohio, have invented certain new and useful Improvements in Combined Feed and Water Buckets, of which the following is a specification.

My invention relates to a combined feed and water bucket particularly designed for use in feeding and watering horses and has for its object the provision of a bucket of this character having a feed hopper located at one side and constructed in such manner that the feed therefrom is permitted to pass into the body of the bucket slowly, thereby requiring the animal to eat slowly and permitting said animal to breathe freely while feeding.

A further object of the invention is the provision of a device of this character constructed in such manner that it may be hung upon a wall and supported at such an angle that the animal may have ready access thereto.

Further objects and advantages of the invention will be set forth in the detailed description which now follows.

Figure 1:
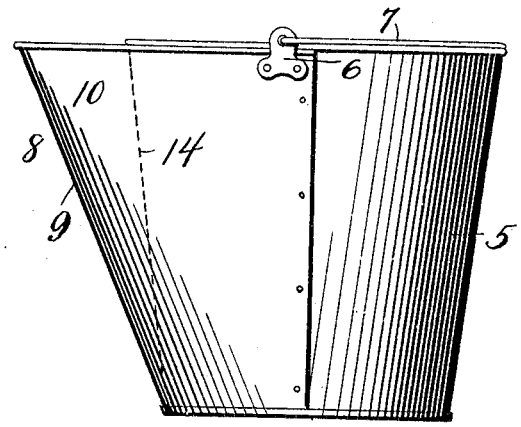
Figure 2:
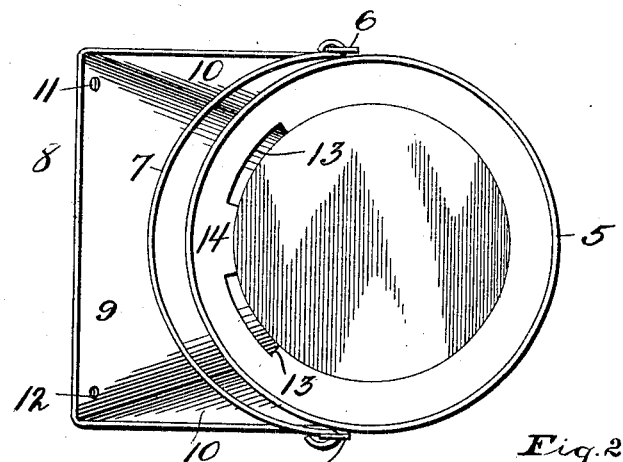
Figure 3:
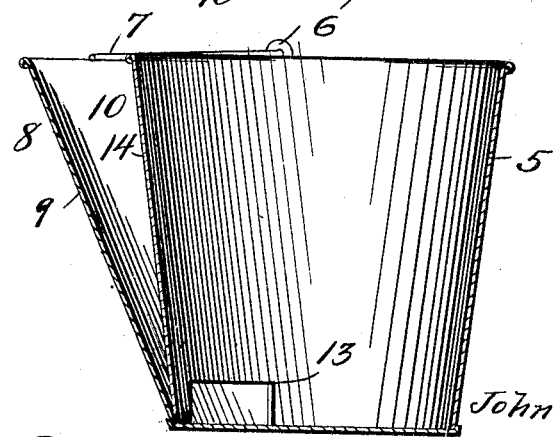

In the accompanying drawing: Figure 1 is a side elevation of a bucket constructed in accordance with the invention, Fig. 2 is a plan view of the device, and, Fig. 3 is a vertical section of the device.

Like numerals designate corresponding parts in all of the figures of the drawing.

Referring to the drawing, the numeral 5 designates a bucket of the usual and well known construction, said bucket being provided with the usual ears 6 and bail or handle 7. A feed hopper 8 is located at one side of the bucket and is secured thereto; this hopper comprising the front wall 9 and the end walls 10. The front wall 9 is an inclined wall and is pierced at 11 and 12 to permit the bucket to be hung upon nails and consequently supported from a wall. Feed openings 13 are formed through the wall 14 of the bucket adjacent the bottom of the bucket and the feed passes through these openings from the hopper 10 to the interior of the bucket body 5.

It is desirable in feeding horses to compel them to eat slowly.

The operation of the device is as follows: When it is desired to feed a horse, oats or other grain is placed in the hopper 8 and some of said grain passes through the openings 13 to the interior of the bucket 5. As the animal eats this grain and in so doing, clears it away from the openings 13, more grain falls through said openings. Since there is never a very large amount of grain within reach of the animal at one time, said animal eats slowly and does not waste the grain as is the case when a large amount of grain is placed within his reach at one time. This feed bucket may be used to water the horses, it being filled with water in the usual manner. The bail 7 may be swung over the top of the hopper 9 to prevent the horse from getting at the grain from the top of the hopper. Since the wall 9 is an inclined one, it follows that when the device is hung up against a wall, with the wall 9 of the feed hopper in a vertical position, the bucket is tilted at an angle to permit the animal to readily reach the grain.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. In a device of the character described, the combination with an annular pail, of a feed hopper secured to said pail at one side thereof, said feed hopper comprising a plane front wall and end walls, the plane front wall being adapted to rest against a wall to prevent the pail from swinging, there being openings formed through the wall of the pail to establish communication between the interior of the pail and the interior of the feed hopper.

2. In a device of the character described, the combination with an annular pail, of a feed hopper secured to said pail at one side thereof, said feed hopper comprising a plane front wall and end walls, the plane front wall being adapted to rest against the wall to prevent the pail from swinging, there being openings formed through the wall of the pail to establish communication between the interior of the pail and the interior of the feed hopper, and a bail by which the pail may be carried, said bail lying over the top of the feed hopper when the structure is hung upon a wall.

In testimony whereof I affix my signature in presence of two witnesses.

JOHN F. ALEXANDER.

Witnesses:
 FRANK G. CAMPBELL,
 L. CARL STOUGHTON.